(12) United States Patent
Iwata et al.

(10) Patent No.: US 7,335,851 B2
(45) Date of Patent: Feb. 26, 2008

(54) GAP MEASUREMENT APPARATUS

(75) Inventors: Takaaki Iwata, Tokyo (JP); Kazuyuki Tsuchiya, Hyogo (JP); Hiroyoshi Omura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 137 days.

(21) Appl. No.: 11/272,880

(22) Filed: Nov. 15, 2005

(65) Prior Publication Data
US 2006/0289408 A1 Dec. 28, 2006

(30) Foreign Application Priority Data
Jun. 9, 2005 (JP) ............... 2005-169853

(51) Int. Cl.
*B23K 10/00* (2006.01)
(52) U.S. Cl. .............. 219/121.54; 219/121.4; 219/121.43
(58) Field of Classification Search ............ 219/121.6, 219/121.61, 121.63, 121.59, 121.56, 121.48, 219/121.43, 121.4
See application file for complete search history.

(56) References Cited

U.S. PATENT DOCUMENTS 5,698,120 A * 12/1997 Kurosawa et al. ..... 219/121.62
6,150,826 A * 11/2000 Hokodate et al. ........... 324/662
6,509,744 B1    1/2003 Biermann et al.

FOREIGN PATENT DOCUMENTS

| JP | 6-7976 | 1/1994 |
|----|--------|--------|
| JP | 2000-234903 | 8/2000 |
| JP | 2004-361276 | 12/2004 |

* cited by examiner

*Primary Examiner*—Mark Paschall
(74) *Attorney, Agent, or Firm*—Oblon, Spivak, McClelland, Maier & Neustadt, P.C.

(57) ABSTRACT

A detection unit (8) is disposed for detecting the magnitudes of $f_1$ and $f_2$ frequency components of a composite signal which is passed through a center electrode cable (4). A detecting signal generating unit (9) generates a detecting signal corresponding to a gap between a nozzle (5) and a workpiece (6) from the magnitudes of the $f_1$ and $f_2$ frequency components of the composite signal, which are detected by the detection unit (8). As a result, even if plasma occurs in the gap between the nozzle (5) and the workpiece (6), the gap can be detected with a high degree of precision.

15 Claims, 8 Drawing Sheets

(1) NO BREAK
(2) WITH BREAK

FIG.7

GAP MEASUREMENT APPARATUS

BACKGROUND OF THE INVENTION

1. Field of the Invention

The present invention relates to a gap measurement apparatus for use in laser beam machines, for measuring a gap between a nozzle and a workpiece.

2. Description of Related Art

A related art gap measurement apparatus for use in laser beam machines sometimes cannot measure a gap between a nozzle and a workpiece correctly since plasma occurs between the nozzle and the workpiece and acts as an impedance because of a lack of laser power during machining of the workpiece. Therefore, if a change in the capacitance which is equal to or larger than a reference value is detected when the plasma occurs during the machining of the workpiece, the gap between the nozzle and the workpiece is maintained for a fixed time period in order to prevent the nozzle from being moved to collide with the workpiece due to erroneous measurement of the gap between the nozzle and the workpiece (refer to, for example, patent reference 1).

On the other hand, a related art gap measurement apparatus disclosed by, for example, patent reference 2 can measure a voltage which appears at a sensor electrode to determine the real part and the imaginary part of the measured voltage in order to measure a gap between a nozzle and a workpiece even if plasma occurs between the nozzle and the workpiece. The related art gap measurement apparatus disclosed by patent reference 2 includes a single signal generator to generate an AC signal of one frequency, and supplies the AC signal to a cable connected to the nozzle. The related art gap measurement apparatus sets the frequency of the AC signal so that the plasma acts as a pure ohmic resistance.

[Patent reference 1] JP,6-7976,A (see paragraph number [0008] and FIG. 1)

[Patent reference 2] JP,2000-234903,A (see paragraph number [0010] and FIG. 1)

While related art gap measurement apparatus constructed as mentioned above can measure the gap between the nozzle and the workpiece even when plasma occurs between the nozzle and the workpiece, a problem with them is that since the AC signal supplied to the cable connected to the nozzle has only one frequency, the accuracy of the measurement of the gap is reduced when plasma occurs in the gap to be measured.

SUMMARY OF THE INVENTION

The present invention is made in order to solve the above-mentioned problem, and it is therefore an object of the present invention to provide a gap measurement apparatus which can measure a gap between a nozzle and a workpiece with a high degree of precision even if plasma occurs in the gap to be measured.

In accordance with the present invention, there is provided a gap measurement apparatus including a detection unit for detecting a plurality of frequency components from a composite signal which is passed through a cable, and a detecting signal generating unit for generating a detecting signal corresponding to a gap between a nozzle and a workpiece from the plurality of frequency components detected by the detection unit. Therefore, the gap measurement apparatus can measure the gap between the nozzle and the workpiece with a high degree of precision even if plasma occurs in the gap.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
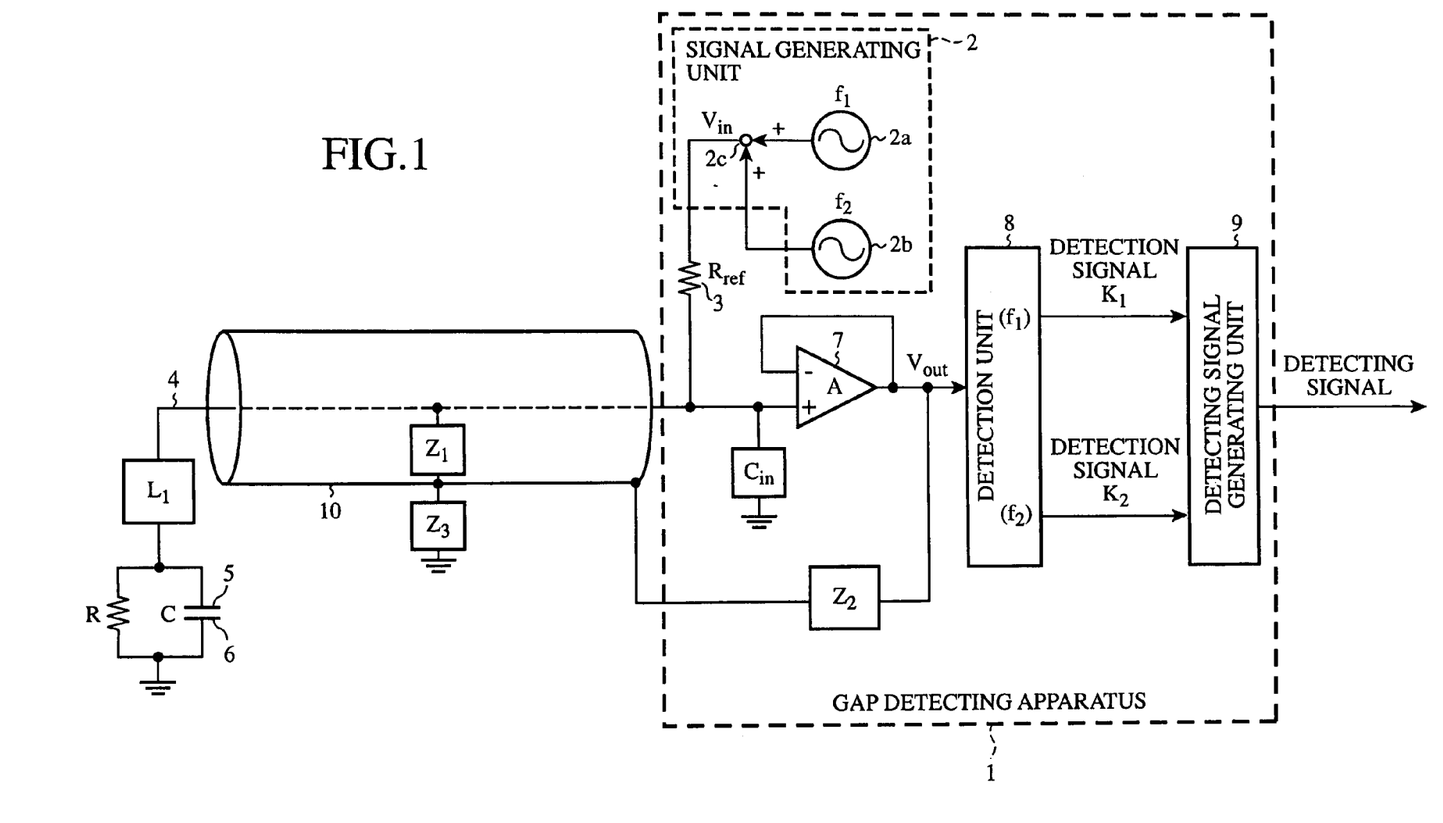
FIG. 1 is a block diagram showing a gap measurement apparatus in accordance with embodiment 1 of the present invention.

FIG. 1 is a block diagram showing a gap measurement apparatus in accordance with embodiment 1 of the present invention. In the figure, a signal generating unit 2 of the gap measurement apparatus 1 is a processing unit for generating a signal required for measurement. The signal generating unit 2 includes a signal generator 2a, another signal generator 2b, and an adder 2c. The signal generator 2a of the signal generating unit 2 generates a signal having a frequency close to a resonance frequency (for simplicity, assume that the signal generator 2a generates a signal having the resonance frequency $f_1$ from here on), and the signal generator 2b of the signal generating unit 2 generates a signal having a frequency lower than the above-mentioned frequency close to the resonance frequency (for simplicity, assume that the signal generator 2b generates a signal having a frequency $f_2$ lower than the resonance frequency from here on). The adder 2c of the signal generating unit 2 combines the signal having the frequency $f_1$ generated by the signal generator 2a and the signal having the frequency $f_2$ generated by the signal generator 2b into a composite signal, and then outputs the composite signal. The signal generating unit 2 constitutes a signal generating means.

A reference resistor 3 has an end which is connected to the signal generating unit 2, and another end which is connected to a center electrode cable 4. The center electrode cable 4 is connected to the leading end of a nozzle 5 for use in a laser beam machine, and guides the composite signal outputted from the signal generating unit 2 to the nozzle 5 for use in the laser beam machine. The nozzle 5 disposed at an end of a machining head in the laser beam machine serves as a sensor electrode, and works like a capacitor together with a workpiece 6 (the workpiece 6 is connected to GND of the circuit) which is an object to be machined and produces a gap capacitance C. The gap capacitance C varies with distance between the nozzle 5 and the workpiece 6. When plasma occurs between the nozzle 5 and the workpiece 6 due to insufficient laser power during machining of the workpiece 6, the plasma affects the system as a plasma impedance which is coupled in parallel with the gap capacitance C. In this embodiment 1, since the plasma impedance has a capacitance component which is undistinguishable from the gap capacitance C, a frequency which causes the plasma impedance to mainly act as an ohmic resistance is selected. The influence upon the system by the plasma is therefore based on a plasma resistance R. Elimination of this influence will be considered hereafter.

An OP amplifier 7 serves as a buffer and outputs a signal $V_{out}$ corresponding to the composite signal from the signal generating unit 2 which is passed through the center electrode cable 4. A detection unit 8 is designed to detect the magnitudes of $f_1$ and $f_2$ frequency components of the output signal $V_{out}$, and generates detection signals $K_1$ and $K_2$, where $K_1$ implies the gain of the $f_1$ frequency component of the signal $V_{out}$, and $K_2$ implies the gain of the $f_2$ frequency component of the signal $V_{out}$. The detection unit 8 constitutes a detection means. A detecting signal generating unit 9 carries out a process of generating a detecting signal corresponding to the gap between the nozzle 5 and the workpiece 6 from the detection signals $K_1$ and $K_2$ outputted from the detection unit 8. The detecting signal generating unit 9 constitutes a detecting signal generating means.

In the figure, $L_1$ denotes a cable inductance of the center electrode cable 4, $Z_1$ denotes a cable-to-cable capacitive impedance which exists between a guard-electrode cable 10 for covering the center electrode cable 4 and the center electrode cable 4, $Z_2$ denotes an impedance existing in the circuit board, $Z_3$ denotes a cable stray capacitive impedance of the guard-electrode cable 10, and $C_{in}$ denotes an OP amplifier input capacitance of the OP amplifier 7.

Next, the operation of the gap measurement apparatus in accordance with this embodiment of the present invention will be explained. The signal generator 2a of the signal generating unit 2 generates a signal having a frequency $f_1$ at which the system gain varies with a good response to changes in the gap capacitance C, i.e., a signal having a frequency equal to the resonance frequency. The other signal generator 2b of the signal generating unit 2 generates a signal having a frequency $f_2$ at which the system gain varies with a good response to changes in the plasma resistance R of plasma which occurs between the nozzle 5 and the workpiece 6, i.e., a signal having a frequency lower than the resonance frequency. When receiving the signal having the frequency $f_1$ from the signal generator 2a and signal having the frequency $f_2$ from the other signal generator 2b, the adder 2c of the signal generating unit 2 combines the signal having the frequency $f_1$ and signal having the frequency $f_2$ into a composite signal $V_{in}$, and outputs the composite signal $V_{in}$.

The composite signal $V_{in}$ outputted from the signal generating unit 2 is guided to the center electrode cable 4 via the reference resistor 3, and the center electrode cable 4 then guides the composite signal $V_{in}$ to the nozzle 5 for use in the laser beam machine. The composite signal $V_{in}$ which is passed through the center electrode cable 4 is made to branch as a measurement signal, and the measurement signal is inputted into the OP amplifier 7.

The OP amplifier 7 functions as a buffer and outputs an output signal $V_{out}$ which corresponds to the measurement signal to the detection unit 8. The output signal $V_{out}$ of the OP amplifier 7 is made to branch before entering the detection unit 8, and is guided to the guard-electrode cable 10 via the circuit board impedance $Z_2$. The reason for using the OP amplifier 7 guiding the output signal $V_{out}$ to the guard-electrode cable 10 is to make the voltage of the guard-electrode cable 10 be the same as that of the center electrode cable 4, thereby preventing the output signal $V_{out}$ from being affected by stray capacitances other than the gap capacitance C as much as possible.

When receiving the output signal $V_{out}$ from the OP amplifier 7, the detection unit 8 detects the magnitude of the output signal $V_{out}$, and outputs detection signals $K_1$ and $K_2$ to the detecting signal generating unit 9, where $K_1$ implies the magnitude of the $f_1$ frequency component of the signal $V_{out}$, and $K_2$ implies the magnitude of the $f_2$ frequency component of the signal $V_{out}$. One possible form of the detection unit 8 is a unit including two parts: (1) a band pass filter for separating the output signal $V_{out}$ into the $f_1$ frequency component and the $f_2$ frequency component signal; (2) a detector for detecting the amplitude of each of the $f_1$ and $f_2$ frequency component signals. Another possible form is a digital signal processing unit such as a DFT (Digital Fourier Transformer). After receiving the detection signals $K_1$ and $K_2$ from the detection unit 8, the detecting signal generating unit 9 generates a detecting signal corresponding to the gap between the nozzle 5 and the workpiece 6 from the detection signals $K_1$ and $K_2$, as will be mentioned below in detail.

Since the gap capacitance C is only as small as few pF, it is necessary to prevent the center electrode cable 4 from being affected by stray capacitances in the vicinity of the center electrode cable as much as possible. When the center electrode cable 4 has a practical size, there inevitably exists the cable-to-cable capacitive impedance $Z_1$ between the center electrode cable 4 and the guard-electrode cable 10. However, when the center electrode cable 4 and guard-electrode cable 10 have the same voltage, the influence of the stray capacitances upon the center electrode cable 4 can be eliminated. Therefore, it is important to select an amplifier having the appropriate frequency characteristics as the OP amplifier 7, so that there is no phase difference between the input and output of the amplifier as much as possible in the frequency domain of interest (frequencies $f_1$ and $f_2$).

In actuality, it is necessary to take into consideration the cable inductance $L_1$ of the center electrode cable 4, the OP amplifier input capacitance $C_{in}$ of the OP amplifier 7, the cable stray capacitive impedance $Z_3$ of the guard-electrode cable 10, etc. By taking these into consideration, the above-mentioned model becomes the one which simulates actual phenomena more accurately. A transfer function H(S) from the composite signal $V_{in}$ outputted by the signal generating unit 2 to the output signal $V_{out}$ of the OP amplifier 7 is expressed by the following equation:

$$H(s) = \cfrac{A}{1 + R_{ref}\left\{\cfrac{1}{Z_6} + \cfrac{1}{Z_1} - \cfrac{\cfrac{1}{Z_1}\left(\cfrac{A}{Z_2} + \cfrac{1}{Z_1}\right)}{\cfrac{1}{Z_1} + \cfrac{1}{Z_2} + \cfrac{1}{Z_3}}\right\}} \qquad (1)$$

ただし

$$Z_6 = \cfrac{1}{sC_{in} + \cfrac{1}{\left(sL_1 + \left(\cfrac{1}{sC + \cfrac{1}{R}}\right)\right)}} \qquad (2)$$

$$= \frac{s^2 L_1 CR + sL_1 + R}{s^3 L_1 C_{in} CR + s^2 L_1 C_{in} + s(C_{in}R + CR) + 1}$$

In this equation, A is the transfer function of the OP amplifier 7, and s is the Laplacian operator. Hereafter, the absolute of the frequency transfer function |H(jω)| (sometimes expressed as "the magnitude of the frequency response") will be called the system gain, where s=jω.

Figure 2:
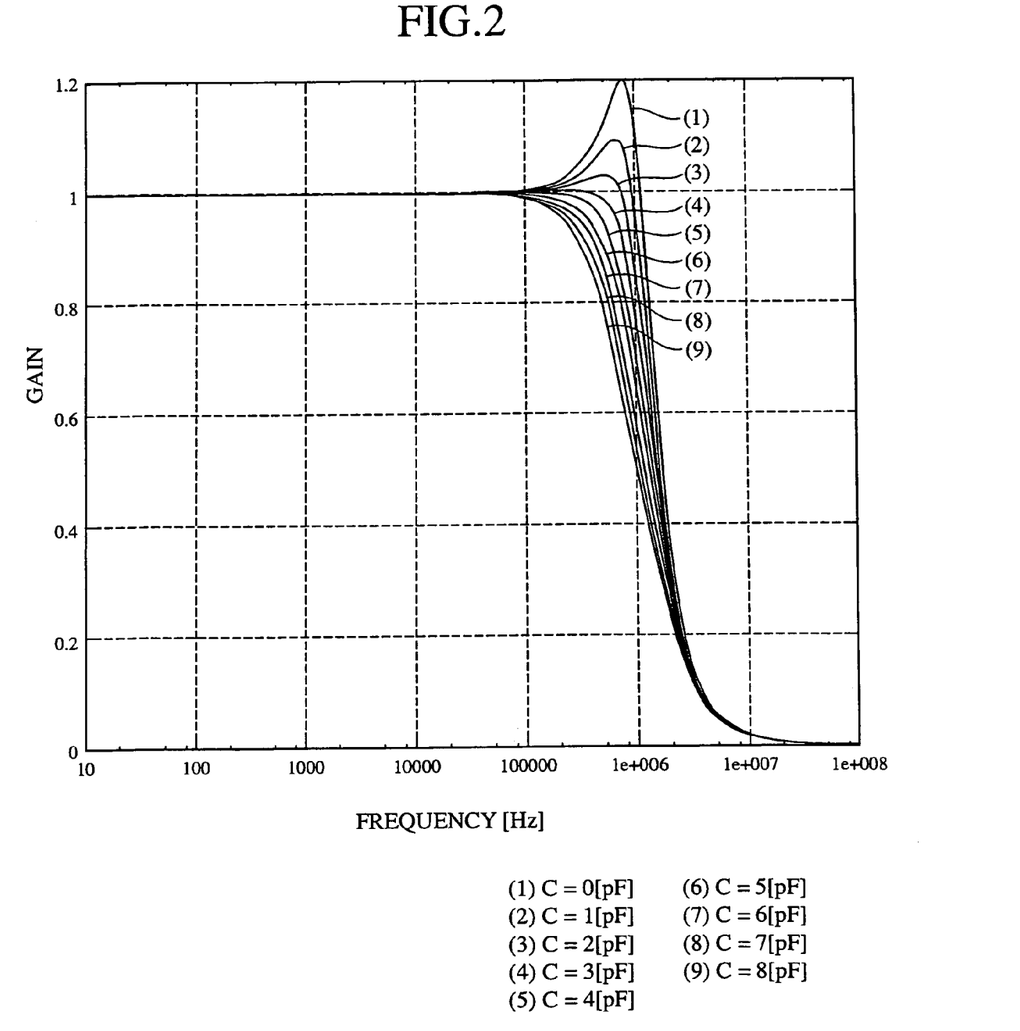
FIG. 2 is a Bode diagram showing a relationship between a frequency and a system gain when a gap capacitance C is varied.
Figure 3:
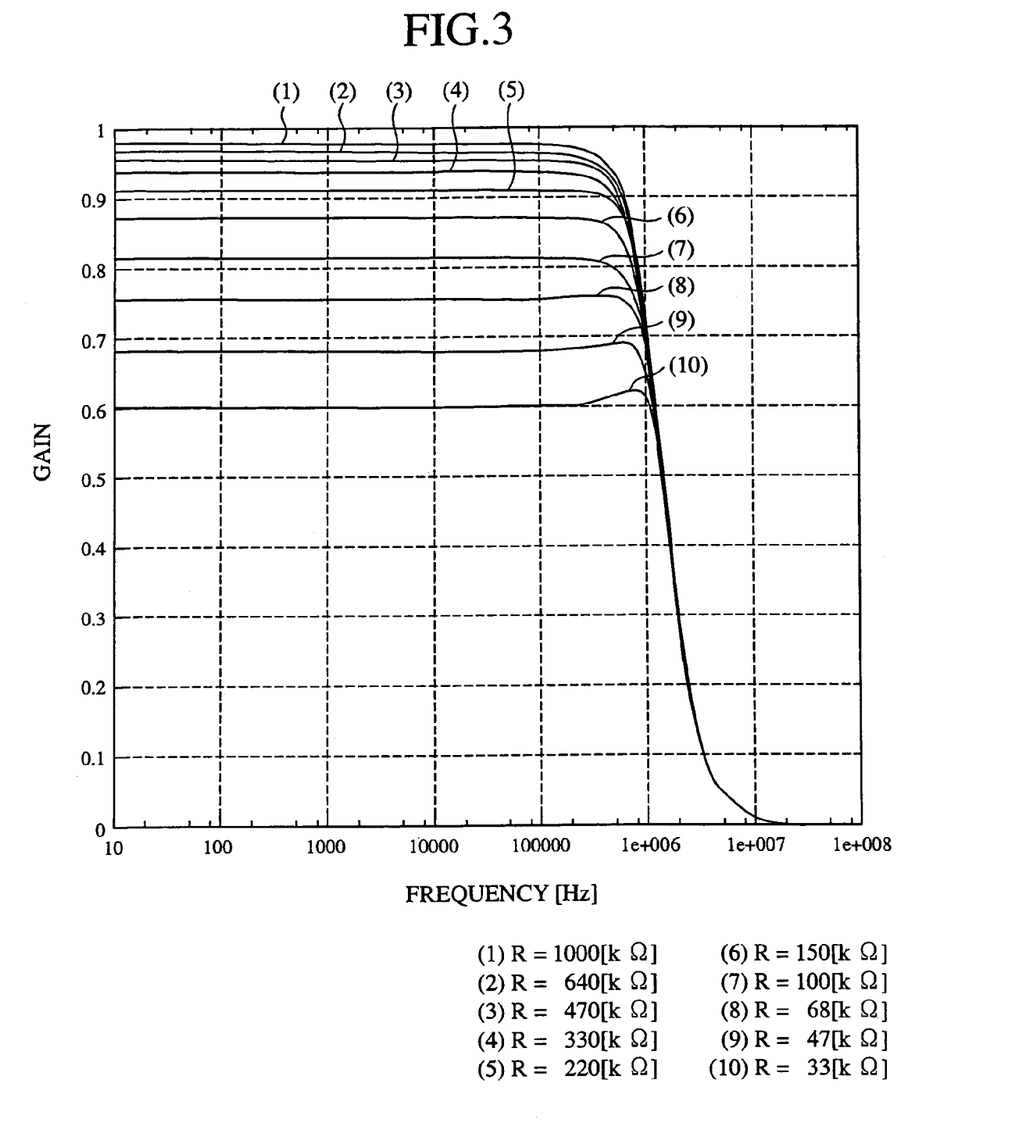
FIG. 3 is a Bode diagram showing a relationship between the frequency and the system gain when a plasma resistance R is varied.
Figure 4:
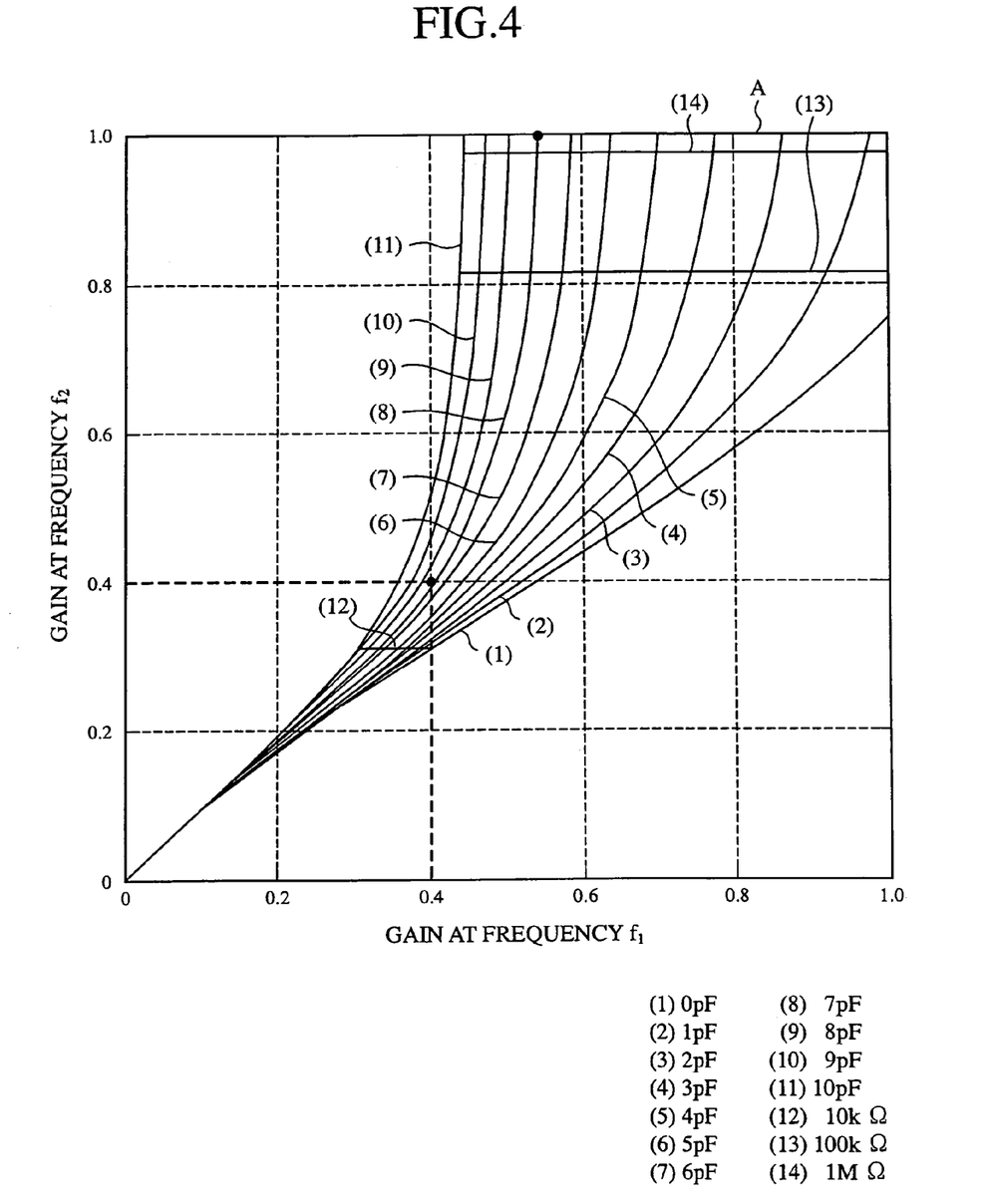
FIG. 4 is a graph of two-frequency-analysis results showing a relationship between the system gain at a frequency $f_1=1$ MHz and the system gain at a frequency $f_2=20$ kHz when the gap capacitance C and plasma resistance R are varied respectively.

FIG. 2 is a Bode diagram showing a relationship between the frequency and the system gain when the gap capacitance C is varied, and FIG. 3 is a Bode diagram showing a relationship between the frequency and the system gain when the plasma resistance R is varied. FIG. 4 is a graph of two-frequency analysis results showing a relationship between the system gain at the frequency $f_1$=1 MHz and the system gain at the frequency $f_2$=20 kHz when the gap capacitance C and plasma resistance R are varied respectively. A constant-R curve and a constant-C curve are plotted in FIG. 4. Hereafter, the principle underlying the measurement of the gap will be explained with reference to FIGS. 2 to 4.

In FIGS. 2 and 3, the Bode diagrams of the transfer function H(S) expressed by equation (1) are shown. A maximum change in the system gain due to changes in the gap capacitance C appears in the vicinity of the resonance frequency, as shown in FIG. 2. FIG. 2 shows an example where the resonance frequency is about 1 MHz. The resonance frequency can always be varied to another frequency by mainly designing the reference resistor 3. In this example, the frequency $f_1$ is designed to have 1 MHz, and the reference resistor 3 $R_{ref}$=22 kΩ is chosen so as to have the resonance frequency at 1 MHz. In this case, the signal generator 2a of the signal generating unit 2 generates a signal having the frequency $f_1$=1 MHz.

On the other hand, changes in the system gain due to changes in the plasma resistance R appear notably at frequencies lower than the resonance frequency, as shown in FIG. 3. Therefore, in order to determine the value of the plasma resistance R, it is preferable to use the frequency $f_2$ lower than the resonance frequency. In other words, in order to determine both the gap capacitance C which appears between the nozzle 5 for use in the laser beam machine and the workpiece 6, and the plasma resistance R with a high degree of precision, it is preferable to use the different frequencies $f_1$ and $f_2$ at which the system gain varies with changes in the gap capacitance C and plasma resistance R, respectively. In the example of FIG. 1, the frequency of the signal used for determining the plasma resistance R is so designed as to have 20 kHz. In other words, the signal generator 2b of the signal generating unit 2 is so constructed as to generate a signal having the frequency $f_2$=20 kHz.

Referring to FIG. 3 in detail, it is apparent that even at the frequency $f_1$=1 MHz, the system gain varies in response to the influence of the plasma resistance R. Since the system gain is affected by both the gap capacitance C and plasma resistance R at every frequency, the influence by the gap capacitance C and the influence by the plasma resistance R cannot be separated thoroughly. Therefore, a method of determining the gap capacitance C and the plasma resistance R from the system gains at the two frequencies $f_1$ and $f_2$ is considered.

As mentioned above, the output signal $V_{out}$ from the OP amplifier 7 is inputted into the detection unit 8. The detection unit 8 detects $f_1$ and $f_2$ frequency components of the output signal $V_{out}$. The magnitude of the $f_1$ frequency component of $V_{out}$ divided by the magnitude of the $f_1$ frequency component of $V_{in}$ corresponds to the system gain at the frequency $f_1$. The magnitude of the $f_1$ frequency component of $V_{in}$ is, in other words, the amplitude of the signal generated by the signal generator 2a. The same holds for the frequency $f_2$. The amplitude of each signal generated by the signal generating unit 2 is assumed to be "1" for simplicity, hereafter.

The detecting signal generating unit 9 has a function of carrying out two-frequency analysis as shown in FIG. 4 to generate a detecting signal corresponding to the gap between the nozzle 5 and the workpiece 6 from the detection signals $K_1$ and $K_2$ outputted from the detection unit 8. In other words, in order to eliminate the influence of the plasma, the detecting signal generating unit 9 generates a detecting signal which is a component having the frequency $f_1$ in a state in which no plasma occurs in the gap (i.e., in a case where it is assumed that the plasma resistance R=∞Ω). Practically, a sufficiently large value (e.g. 100 MΩ) is substituted to the plasma resistance R of the transfer function H(s), instead of using ∞ to simulate the no plasma situation. To be more specific, in the state in which no plasma occurs in the gap (in the example of FIG. 4, when the system gain at the frequency $f_2$ is "1.0"), the detecting signal generating unit 9 outputs, as the detecting signal corresponding to the gap, the detection signal $K_1$ (i.e., a signal A which falls within a system gain range of about 0.42 to 1.0 at the frequency $f_1$ in the example of FIG. 4) which is the component of the frequency $f_1$, just as it is. However, in a state in which plasma occurs in the gap (in a case where the system gain at the frequency $f_2$ is smaller than "1.0" in the example of FIG. 4), the detecting signal generating unit 9 corrects the detection signal $K_1$ and outputs the corrected detection signal $K_1$ as the detecting signal corresponding to the gap, as follows. For example, when the system gain at the frequency $f_2$ is "0.4" and the system gain at the frequency $f_1$ is "0.4" too, since the gap capacitance C exists on the constant-C curve of 7 pF, the detecting signal generating unit 9 moves the point represented by (the system gain at the frequency $f_2$, the system gain at the frequency $f_1$)=(0.4, 0.4) along the constant-C curve of 7 pF until a corresponding state becomes the state in which no plasma occurs in the gap, i.e., until the point reaches a point where the system gain at the frequency $f_2$ is "1.0", and outputs a value at an intersection of the constant-C curve of 7 pF and a line segment indicating the signal A as the detection signal corresponding to the gap (about 0.52 in the example of FIG. 4).

As can be seen from the above description, in accordance with this embodiment 1, the gap measurement apparatus includes the detection unit 8 for detecting the magnitudes of $f_1$ and $f_2$ frequency components of a composite signal which is passed through the center electrode cable 4, and the detecting signal generating unit 9 for generating a detecting signal corresponding to the gap between the nozzle 5 and the workpiece 6 from the magnitudes of the $f_1$ and $f_2$ frequency components of the composite signal which are detected by the detection unit 8. Therefore, the gap measurement apparatus can measure the gap between the nozzle 5 and the workpiece 6 with a high degree of precision even if plasma occurs in the gap.

In addition, in accordance with this embodiment 1, the signal generating unit 2 of the gap measurement apparatus generates a signal having the resonance frequency and another signal having a frequency lower than the resonance frequency, combines them into a composite signal, and supplies the composite signal to the nozzle 5. Therefore, the gap measurement apparatus can raise the sensitivity to changes in the gap and changes in the plasma.

Embodiment 2

Figure 5:
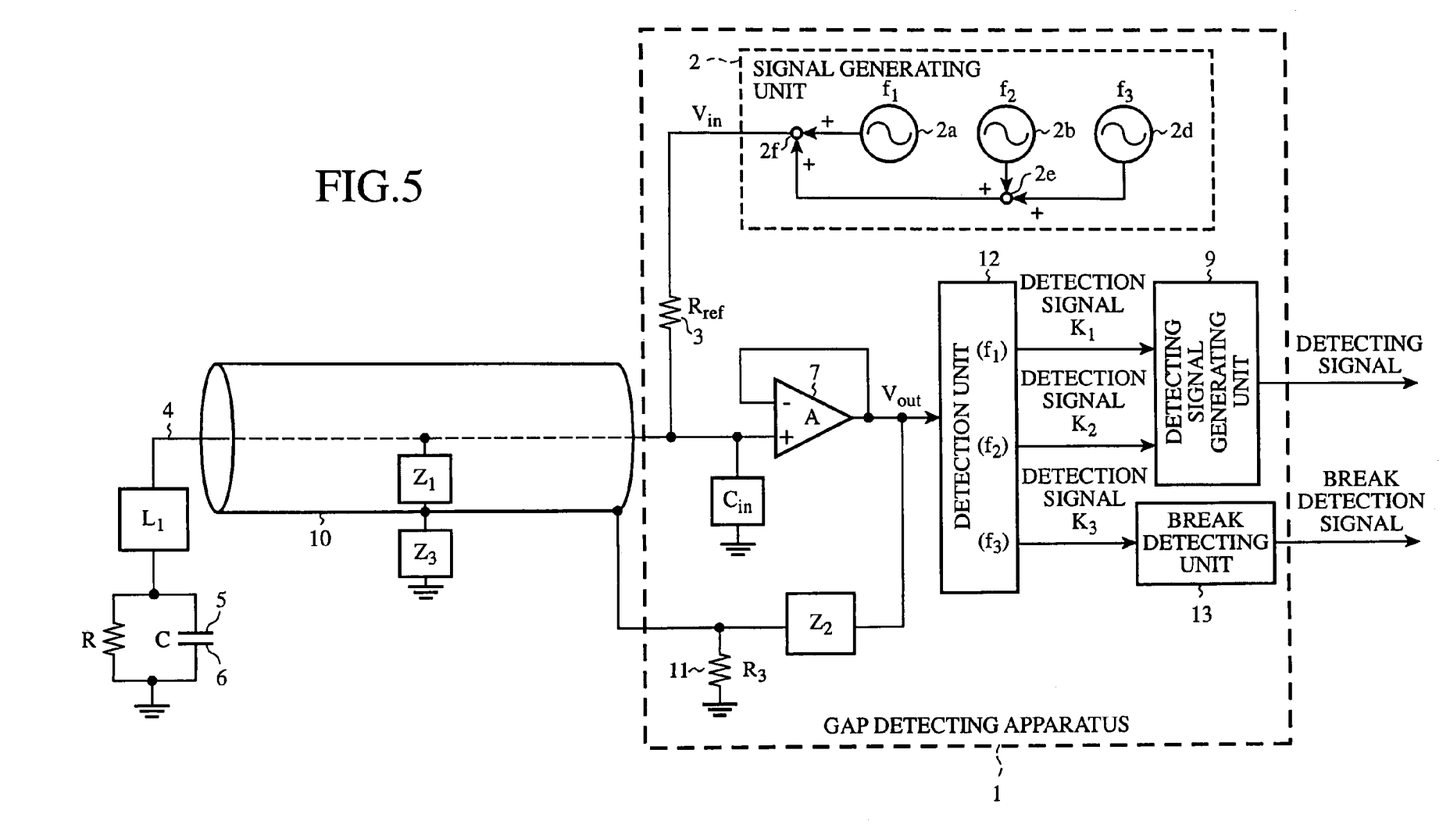
FIG. 5 is a block diagram showing a gap measurement apparatus in accordance with embodiment 2 of the present invention.

FIG. 5 is a block diagram showing a gap measurement apparatus in accordance with embodiment 2 of the present invention. In the figure, the same reference numerals as shown in FIG. 1 denote the same components as those of embodiment 1 or like components, and therefore the explanation of those components will be omitted hereafter. A signal generator 2d of a signal generating unit 2 generates a signal of frequency $f_3$, where $f_3$ is the frequency at which the frequency transfer function H(jω) varies significantly whenever a center electrode cable 4 has a break. An adder 2e of the signal generating unit 2 combines a signal having a frequency $f_2$ generated by another signal generator 2b, and the signal having the frequency $f_3$ generated by the signal generator 2d into a composite signal, and outputs the composite signal. Another adder 2f of the signal generating unit 2 combines a signal having a frequency $f_1$ generated by another signal generator 2a and the output signal of the adder 2e into a composite signal, and outputs the composite signal to a reference resistor 3.

A resistor 11 for detection of breaks is a resistor connected between a guard-electrode cable 10 and a ground. A detection unit 12 detects the magnitudes of $f_1$, $f_2$, and $f_3$ frequency components of an output signal $V_{out}$ from an OP amplifier 7, and outputs detection signals $K_1$, $K_2$, and $K_3$ for the frequencies $f_1$, $f_2$, and $f_3$, respectively. The detection unit 12 constitutes a detection means. A break detecting unit 13 carries out a process of determining whether the center electrode cable 4 has a break from the detection signal $K_3$ which is detected by the detection unit 12 and is the magnitude of the $f_3$ frequency component of the output signal $V_{out}$. The resistor 11 for detection of breaks and break detecting unit 13 constitute a break detecting means.

Figure 6:
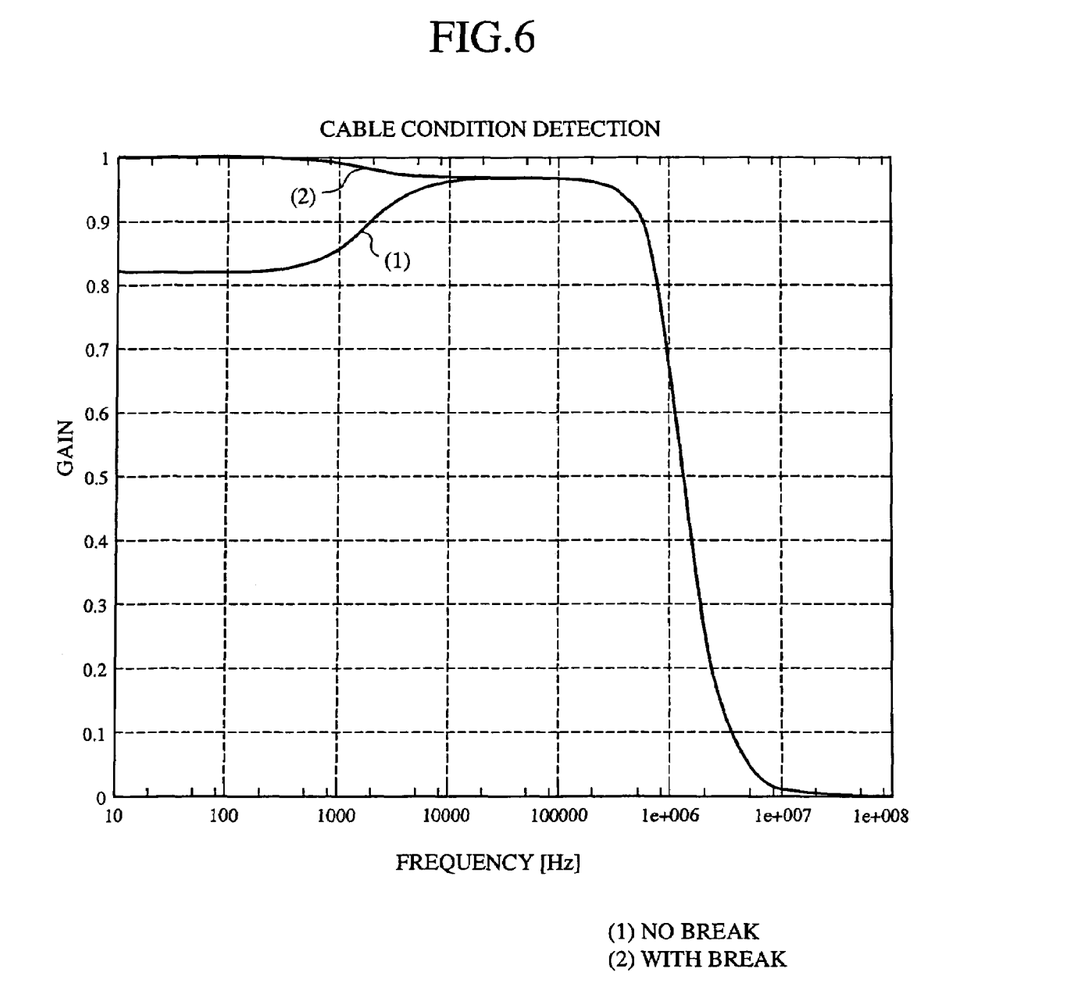
FIG. 6 is a Bode diagram showing the magnitude of the transfer function of the system, comparing normal state where a center electrode cable has no breaks and unusual state where the center electrode cable has a break.

Next, the operation of the gap measurement apparatus in accordance with this embodiment of the present invention will be explained. FIG. 6 is a Bode diagram showing the system gain at normal times when the center electrode cable has no breaks and the system gain at a time which the center electrode cable has a break. Hereafter, the principle underlying the detection of breaks will be explained with reference to FIG. 6.

In a case where the center electrode cable 4 has a break, since the center electrode cable 4 and guard-electrode cable 10 are not affected by each other, this status can be simulated by making a cable-to-cable capacitive impedance $Z_1$ between the cables infinite (a large value from a practical standpoint). In the example of FIG. 5 in which the resistor 11 for detection of breaks is inserted between the guard-electrode cable 10 and the ground, there causes a difference between a system gain at normal times and that at a time when the center electrode cable 4 has a break in a range of low frequencies. In the example of FIG. 5, the resistor 11 for detection of breaks is so designed as to have a resistance $R_3$ of 1 kΩ. As can be seen from the Bode diagram of FIG. 6, in a range of frequencies equal to or lower than 1 kHz, the system gain at normal times is about 0.8, whereas the system gain at a time when the center electrode cable 4 has a break is about 1.

On the other hand, the signal generating unit 2 is provided with the signal generator 2d for generating the signal having the frequency $f_3$=200 Hz, where $f_3$ is the frequency at which the system gain varies significantly whenever the center electrode cable 4 has a break, and outputs a composite signal $V_{in}$ into which the signal having the frequency $f_1$, signal having the frequency $f_2$, and signal having the frequency $f_3$ are combined. Like the detection unit 8 of FIG. 1, the detection unit 12 detects the magnitudes of the $f_1$ and $f_2$ frequency components of the output signal $V_{out}$ and outputs the detection signals $K_1$ and $K_2$ to a detecting signal generating unit 9. The detection unit 12 also detects the magnitude of the $f_3$ frequency component of the output signal $V_{out}$ and outputs the detection signal $K_3$, which is the detected result of the $f_3$ frequency component, to the break detecting unit 13. The magnitude of the $f_3$ frequency component of $V_{out}$ detected by the detection unit 12 divided by the magnitude of the $f_3$ frequency component of $V_{in}$ corresponds to the system gain at the frequency $f_3$. The magnitude of the $f_3$ frequency component of $V_{in}$ is, in other words, the amplitude of the signal generated by the signal generator 2d. The amplitude of the signal generated by the signal generator 2d is also assumed to be "1" for simplicity, hereafter.

When receiving the detection signal $K_3$ which is the detected result of the $f_3$ frequency component from the detection unit 12, the break detecting unit 13 compares the detection signal $K_3$ with a predetermined threshold (e.g., "0.9"), and, when the detection signal $K_3$ is smaller than the threshold, determines that the center electrode cable 4 has no breaks and outputs a break detection signal (e.g., a signal at a Low level) indicating that the center electrode cable 4 has no breaks. In contrast, when the detection signal $K_3$ is larger than the threshold, the break detecting unit 13 determines that the center electrode cable 4 has a break and outputs a break detection signal (e.g., a signal at a High level) which indicates that the center electrode cable 4 has a break.

As can be seen from the above description, in accordance with this embodiment 2, the gap measurement apparatus has the resistor 11 for detection of breaks which is inserted between the guard-electrode cable 10 for covering the center electrode cable 4, and the ground, and determines whether the center electrode cable 4 has a break from the detected result of the $f_3$ frequency component from the detection unit 12. Therefore, the gap measurement apparatus can prevent the measurement of the gap from ending in failure when the center electrode cable 4 has a break.

Embodiment 3

Figure 7:
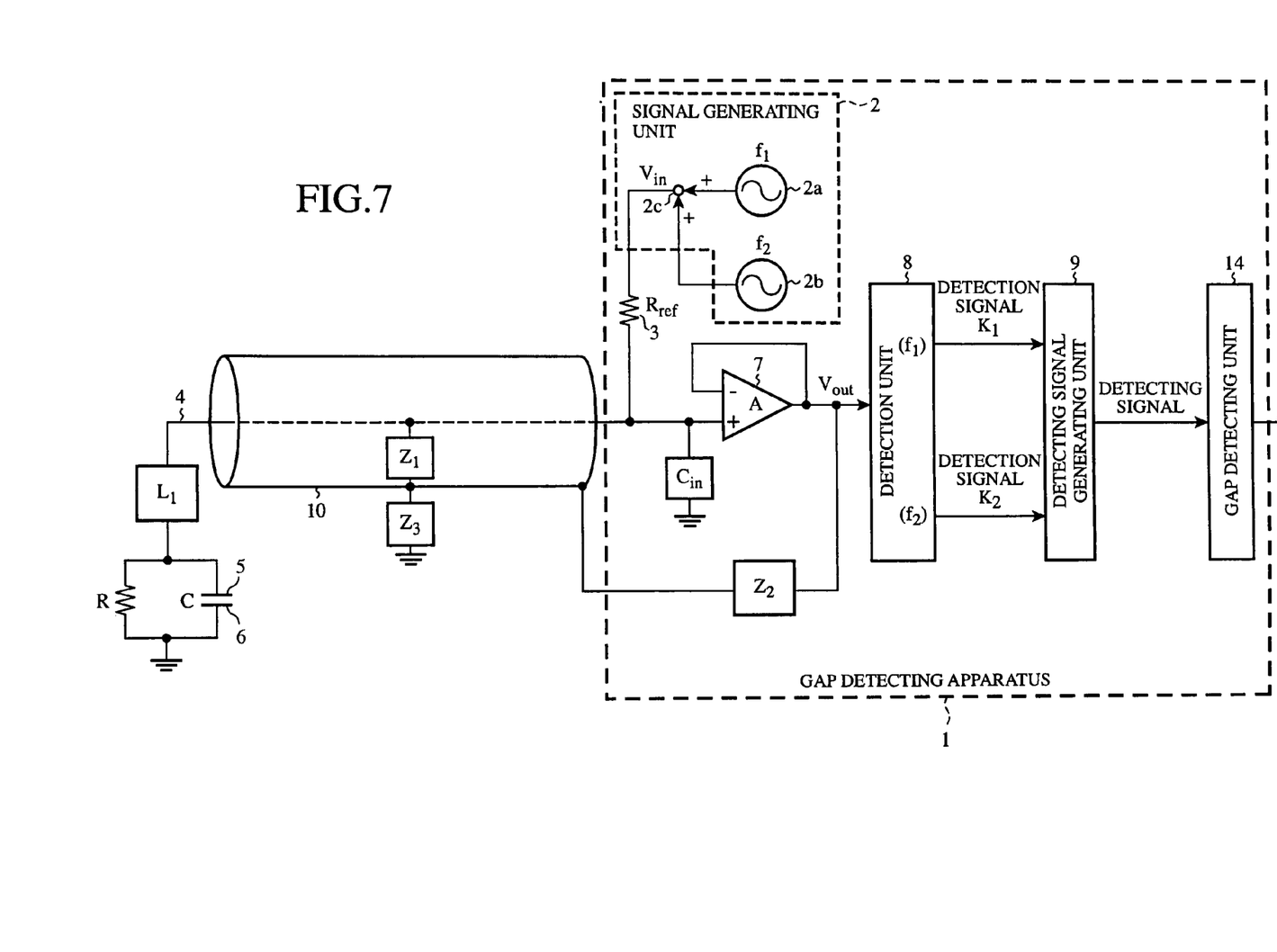
FIG. 7 is a block diagram showing a gap measurement apparatus in accordance with embodiment 3 of the present invention.
Figure 8:
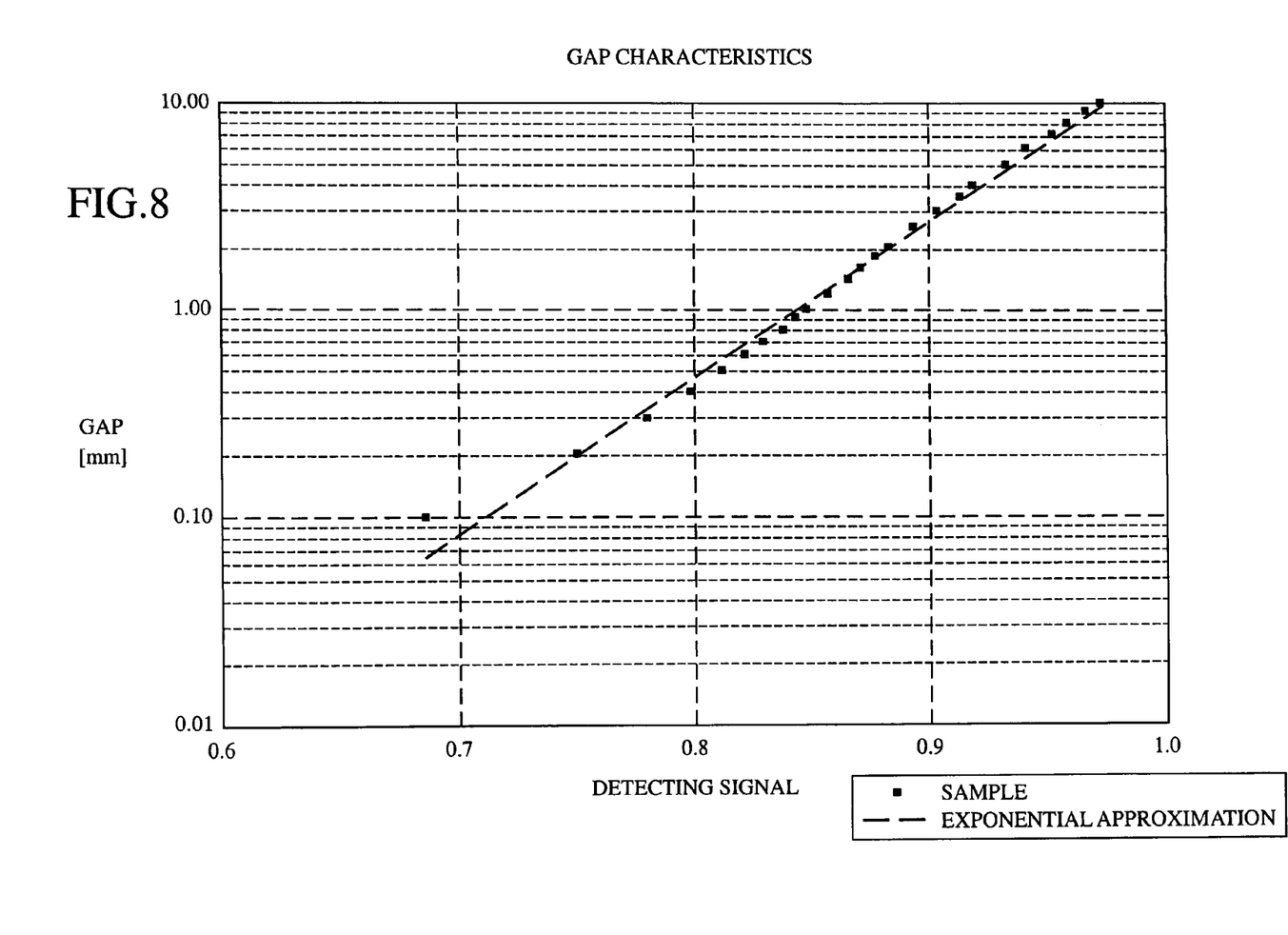
FIG. 8 is an explanatory diagram showing a correspondence between a detecting signal generated by a detecting signal generating unit and a gap which is an object to be measured.

FIG. 7 is a block diagram showing a gap measurement apparatus in accordance with embodiment 3 of the present invention. In the figure, the same reference numerals as shown in FIG. 1 denote the same components as those of embodiment 1 or like components, and therefore the explanation of those components will be omitted hereafter. A gap measurement unit 4 makes a linear correction to a detecting signal generated by a detecting signal generating unit 9, and carries out a process of measuring a gap between a nozzle and a workpiece. The gap measurement unit 14 constitutes a gap measurement means. FIG. 8 is an explanatory diagram showing a correspondence between the detecting signal generated by the detecting signal generating unit 9 and the gap which is the object to be measured.

Next, the operation of the gap measurement apparatus in accordance with this embodiment of the present invention will be explained. As shown in FIG. 8, when a relationship between the detecting signal generated by the detecting signal generating unit 9 and the gap between the nozzle and the workpiece is known, the gap measurement apparatus can determine the gap from the detecting signal.

When the detecting signal generated by the detecting signal generating unit 9 is x and the gap which is the object to be measured is y, the relationship between the detecting signal x and the gap y is approximated well by the following exponential function:

$$y=k_1\exp(k_2 x) \qquad (3)$$

where $k_1$ and $k_2$ are predetermined constants.

Therefore, when receiving the detecting signal x from the detecting signal generating unit 9, the gap measurement unit 14 determines the gap y between the nozzle 5 and the workpiece 6 by substituting the detecting signal x into the above-mentioned equation (3) so as to make a linear correction to the detecting signal x. As an alternative, data indicating the relationship between the detecting signal generated by the detecting signal generating unit 9 and the gap are pre-stored in the gap measurement apparatus, and the gap measurement unit 14 determines the gap according to the pre-stored data. Thus, since the gap measurement apparatus in accordance with this embodiment includes the gap measurement unit 14 which determines the gap between the nozzle 5 and the workpiece 6 by substituting the detecting signal x generated by the detecting signal generating unit 9 into the above-mentioned approximation equation (3) or according to the pre-stored data indicating the relationship between the detecting signal and the gap, the gap measurement apparatus can simplify the correction calculation for determining the gap, which is conventionally required by laser beam machine controllers, or can omit the correction calculation.

Many widely different embodiments of the present invention may be constructed without departing from the spirit and scope of the present invention. It should be understood that the present invention is not limited to the specific embodiments described in the specification, except as defined in the appended claims.

What is claimed is:

1. A gap measurement apparatus comprising:
   a signal generating means for generating a plurality of signals having different frequencies, for combining the plurality of the signals into a composite signal, and for supplying the composite signal to a cable connected to an end of a nozzle for use in a laser beam machine;
   a detection means for detecting a plurality of frequency components from the composite signal which is passed through said cable; and
   a detecting signal generating means for generating a detecting signal corresponding to a gap between said nozzle and a workpiece from said plurality of frequency components detected by said detection means,
   the composite signal supplied to the cable at a point prior to an input of the detection means for detecting a plurality of frequency components.

2. The gap measurement apparatus according to claim 1, wherein the plurality of signals generated by said signal generating means include a signal having a resonance frequency, and a signal having a frequency which is lower than the resonance frequency.

3. The gap measurement apparatus according to claim 1, wherein said apparatus further includes a resistor for detection of breaks which is inserted between a guard-electrode cable for covering said cable and a ground, and a break detecting means for determining whether or not said cable has a break based on a predetermined frequency component detected by said detection means.

4. The gap measurement apparatus according to claim 1, wherein said apparatus further includes a gap measurement means for making a linear correction to the detecting signal generated by said detecting signal generating means so as to determine the gap between said nozzle and said workpiece.

5. A gap measurement method, comprising:
   generating a plurality of signals having different frequencies;
   combining the plurality of signals into a composite signal;
   supplying the composite signal to a cable connected to an end of a nozzle in a laser beam machine;
   detecting a plurality of frequency components from the composite signal; and
   generating a detecting signal, corresponding to a gap between said nozzle and a workpiece, from said detected plurality of frequency components,
   the composite signal supplied to the cable at a point prior to a point where the plurality of frequency components are detected.

6. The gap measurement method according to claim 5, wherein the plurality of signals generated comprise:
   a signal having a resonance frequency; and
   a signal having a frequency which is lower than the resonance frequency.

7. The gap measurement method according to claim 5, further comprising:
   determining whether or not said cable has a break based on a predetermined frequency component detected during said detecting step, wherein
   the step of determining includes detecting breaks with a resistor which is inserted between a guard-electrode cable covering said cable and a ground.

8. The gap measurement method according to claim 5, further comprising:
   making a linear correction to the detecting signal and determining the gap between said nozzle and said workpiece.

9. The gap measurement method according to claim 5, further comprising:
   determining whether or not said cable has a break based on a predetermined frequency component detected during said detecting step.

10. A gap measurement apparatus, comprising:
    a signal generator configured to generate a plurality of signals having different frequencies, to combine the plurality of signals into a composite signal;
    a cable connected to an end of a nozzle in a laser beam machine and which receives the composite signal from said signal generator;
    a frequency detector electrically connected to said signal generator and configured to detect a plurality of frequency components from the composite signal; and
    a detecting signal generator electrically connected to said frequency detector and configured to generate a detecting signal, corresponding to a gap between said nozzle and a workpiece, from said detected plurality of frequency components, the composite signal supplied to the cable at a point prior to an input of the frequency detector.

11. The gap measurement apparatus according to claim 10, wherein the plurality of signals generated by said signal generator include a signal having a resonance frequency, and a signal having a frequency which is lower than the resonance frequency.

12. The gap measurement apparatus according to claim 10, further comprising:

a break detector electrically connected to the frequency detector and configured to detect whether or not said cable has a break based on a predetermined frequency component detected by said frequency detector, said break detector including a resistor inserted between a guard-electrode covering said cable and a ground.

13. The gap measurement apparatus according to claim 10, further comprising:

a gap measurement device configured to make a linear correction to the detecting signal and to determine the gap between said nozzle and said workpiece.

14. The gap measurement apparatus according to claim 10, further comprising:

a break detector electrically connected to the frequency detector and configured to detect whether or not said cable has a break based on a predetermined frequency component detected by said frequency detector.

15. The gap measurement apparatus according to claim 1, wherein said apparatus further includes a break detecting means for determining whether or not said cable has a break based on a predetermined frequency component detected by said detection means.

* * * * *